March 13, 1928.
D. A. NEVIN
1,662,534
CARD INDEXING DEVICE
Filed Feb. 20, 1925
11 Sheets-Sheet 1
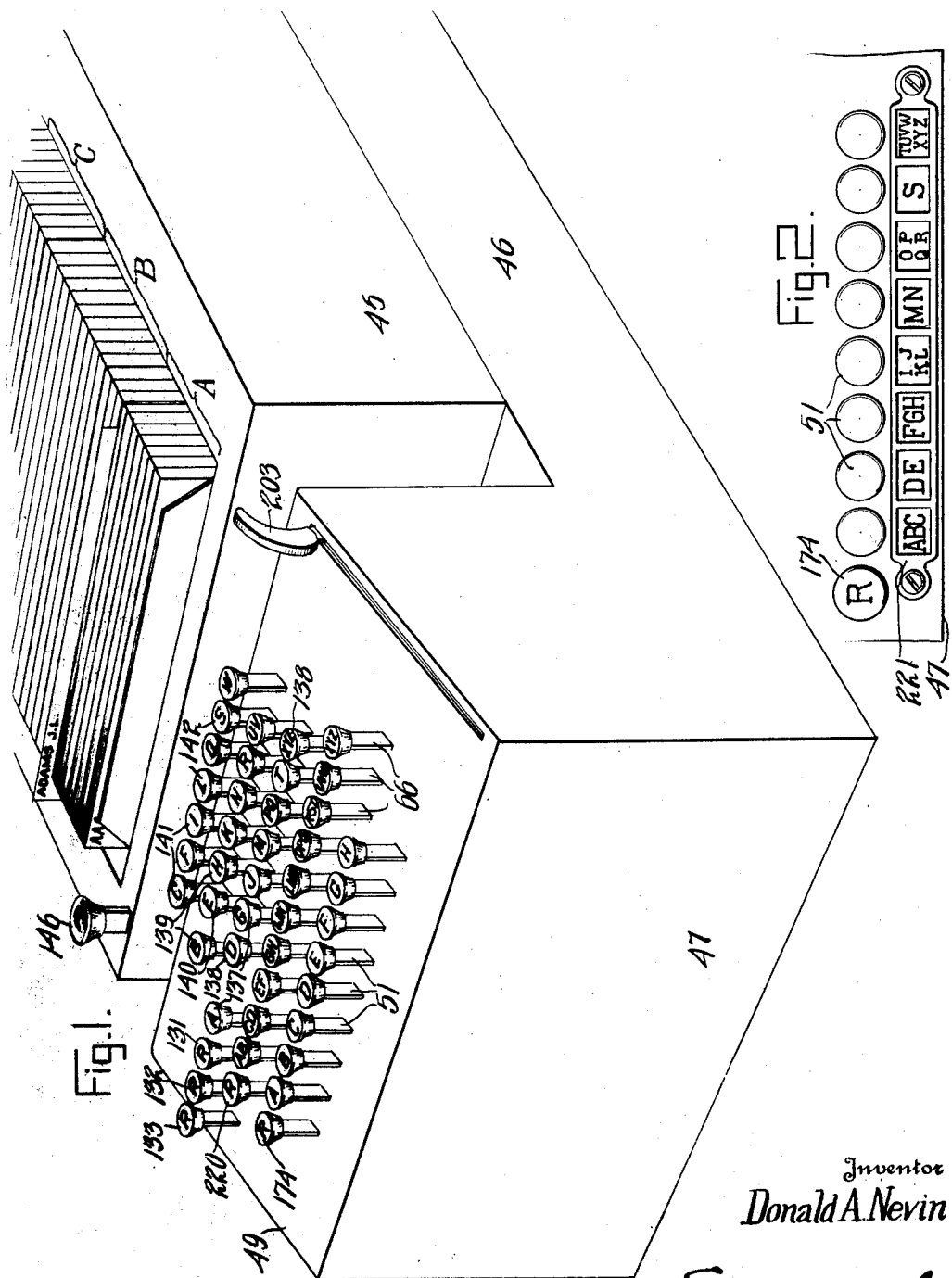
Inventor
Donald A. Nevin
By
*(signature)*
Attorney

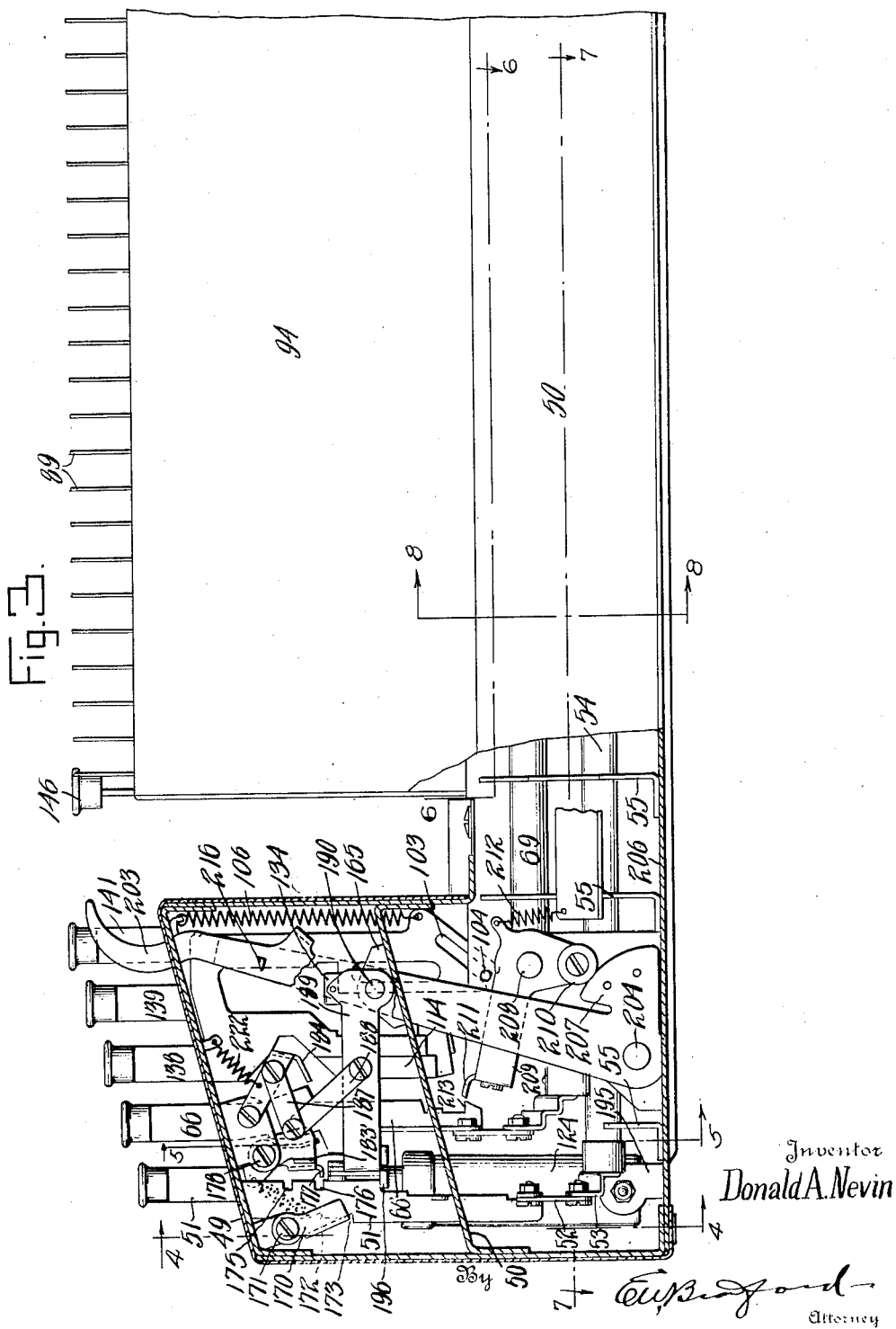

March 13, 1928.

D. A. NEVIN

CARD INDEXING DEVICE

Filed Feb. 20, 1925

1,662,534

11 Sheets-Sheet 3

Inventor
Donald A. Nevin

By

Attorney

March 13, 1928. 1,662,534
D. A. NEVIN
CARD INDEXING DEVICE
Filed Feb. 20, 1925   11 Sheets-Sheet 4

Inventor
Donald A. Nevin

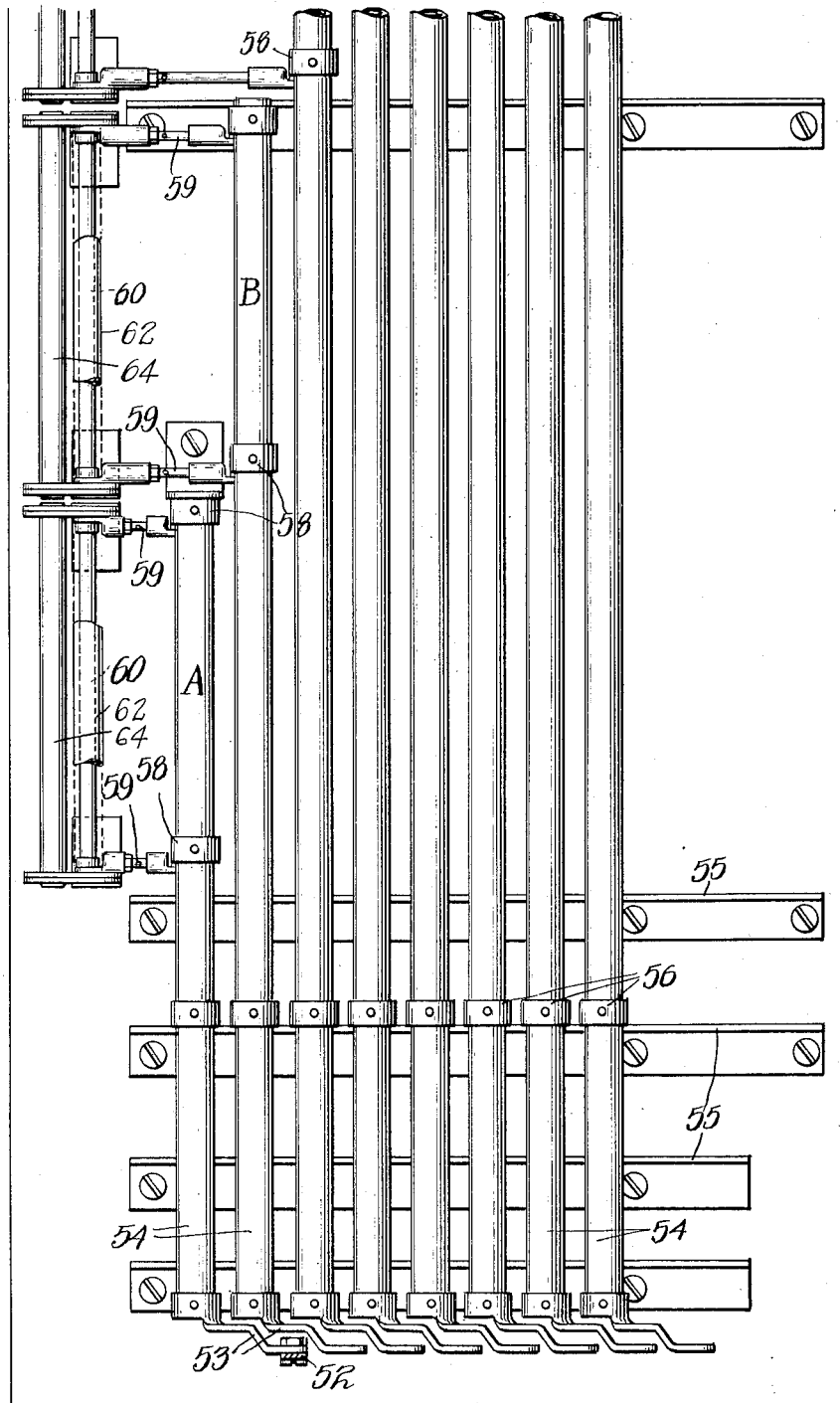

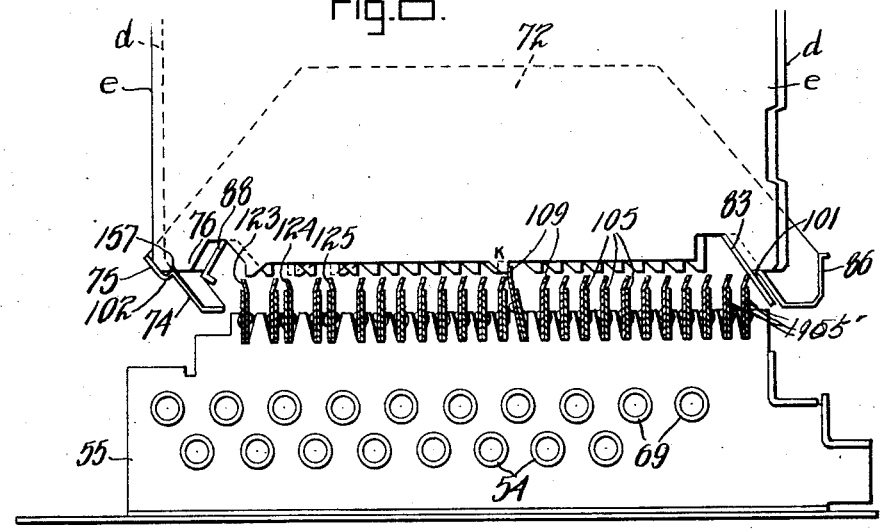
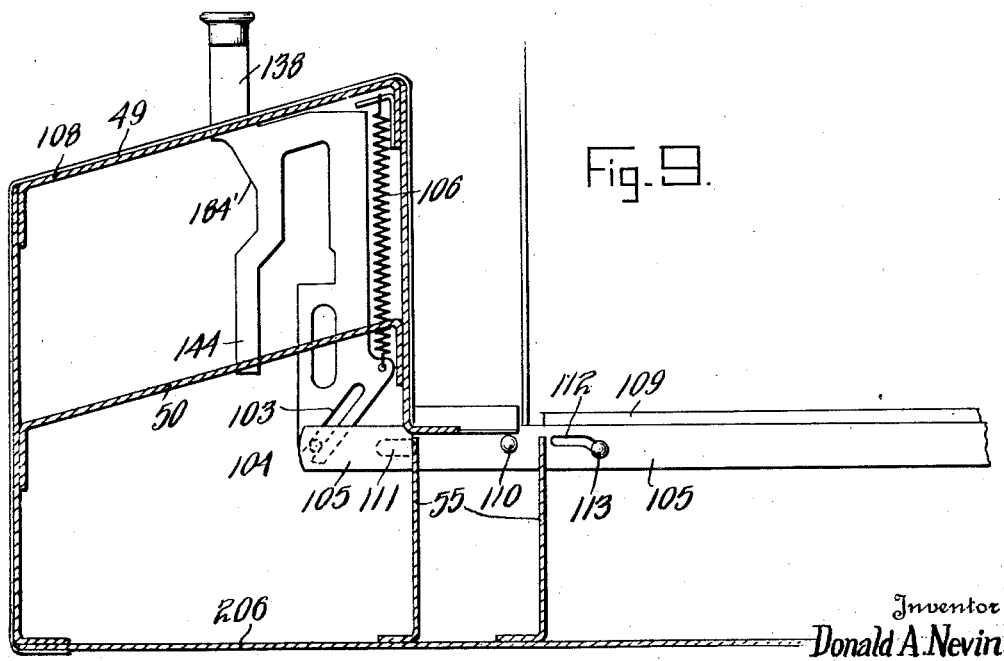

March 13, 1928.
D. A. NEVIN
1,662,534
CARD INDEXING DEVICE
Filed Feb. 20, 1925      11 Sheets-Sheet 7
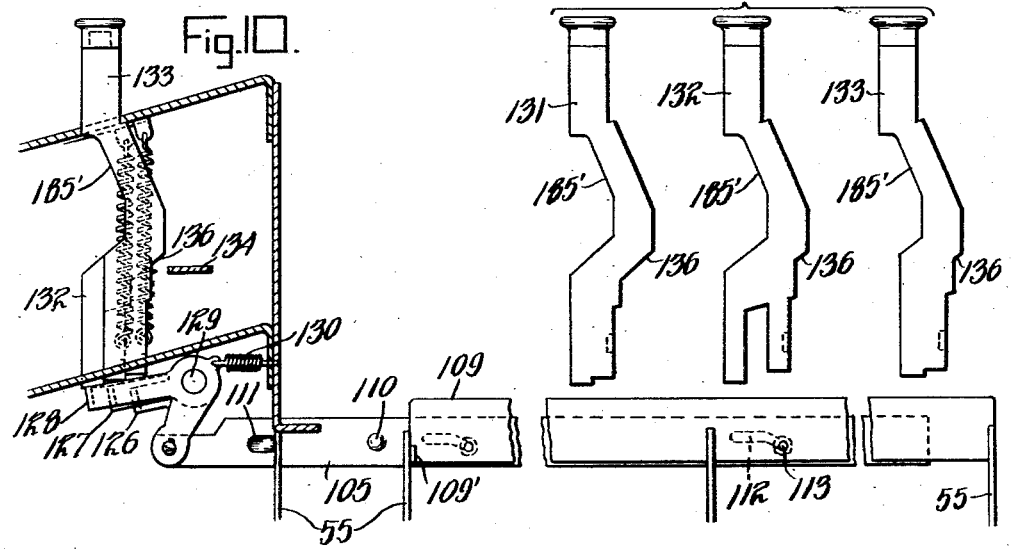
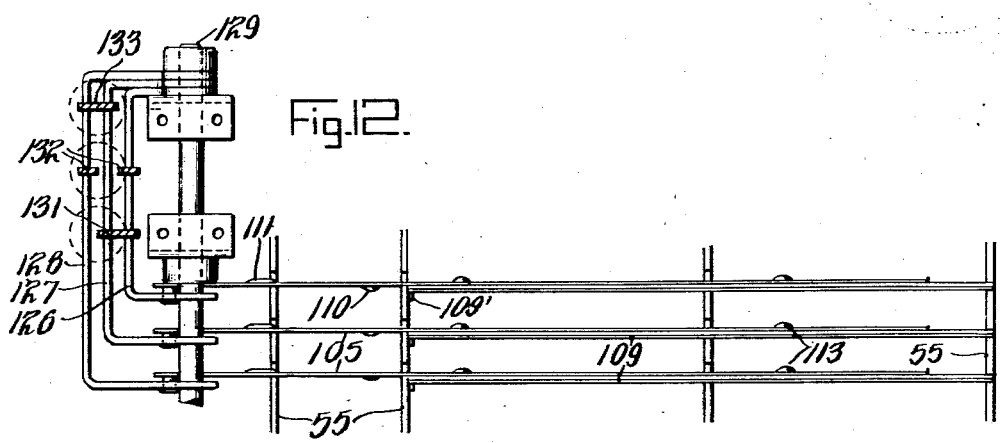
Inventor
Donald A. Nevin
By
Attorney March 13, 1928.  D. A. NEVIN  1,662,534
CARD INDEXING DEVICE
Filed Feb. 20, 1925    11 Sheets-Sheet 8
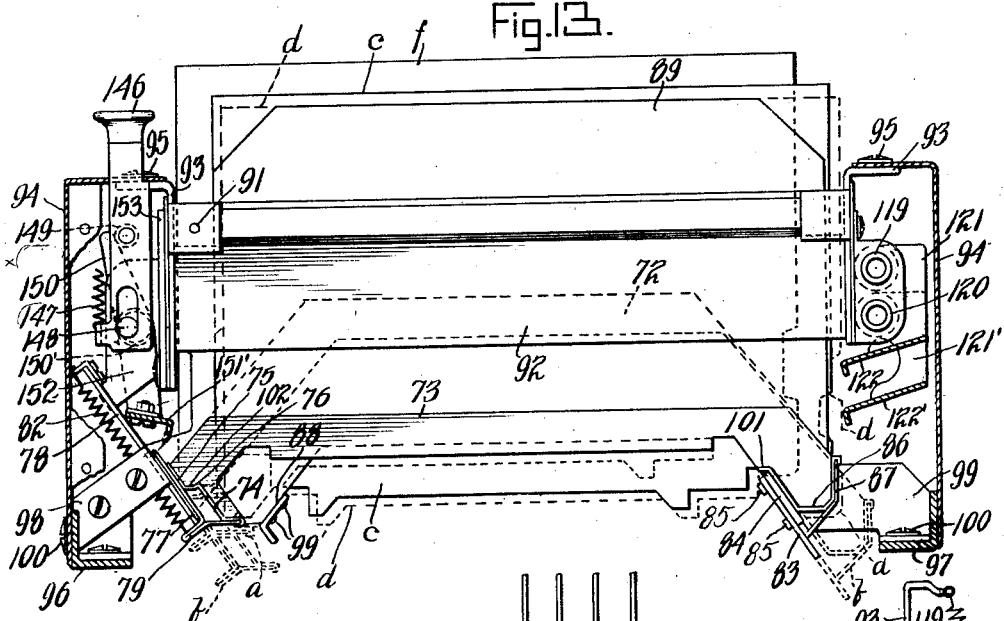
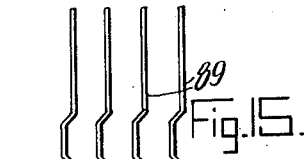
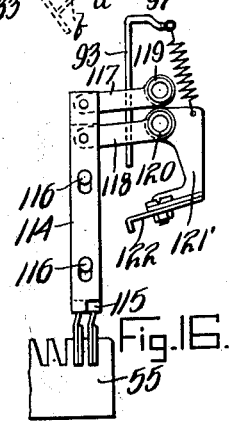
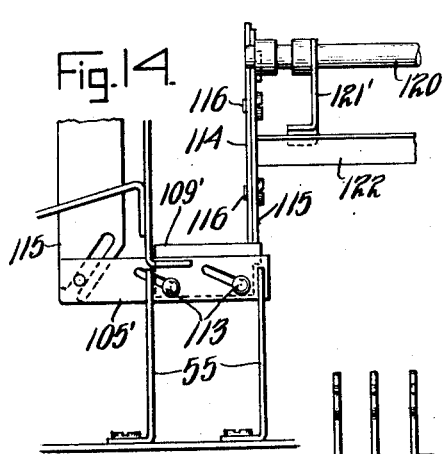
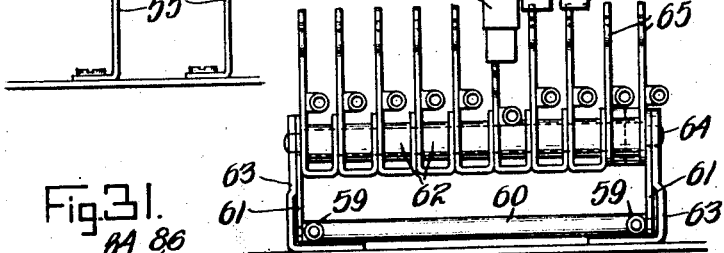
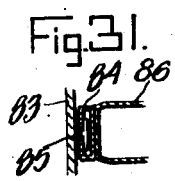
Inventor
Donald A. Nevin
By
Attorney March 13, 1928.  
D. A. NEVIN  
CARD INDEXING DEVICE  
Filed Feb. 20, 1925  
1,662,534  
11 Sheets-Sheet 9
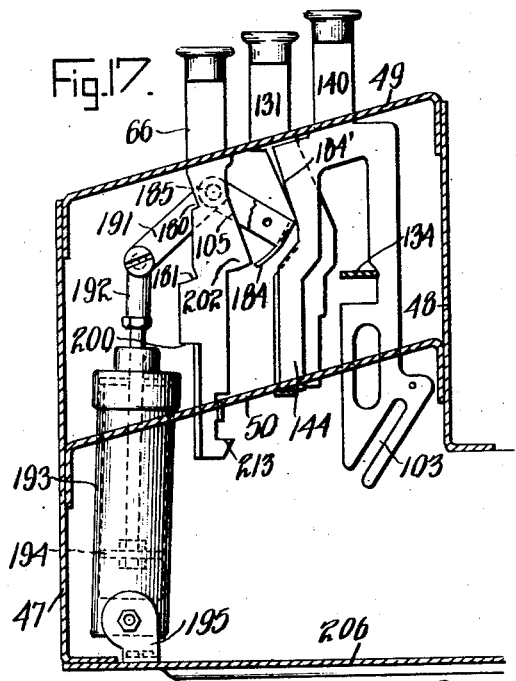
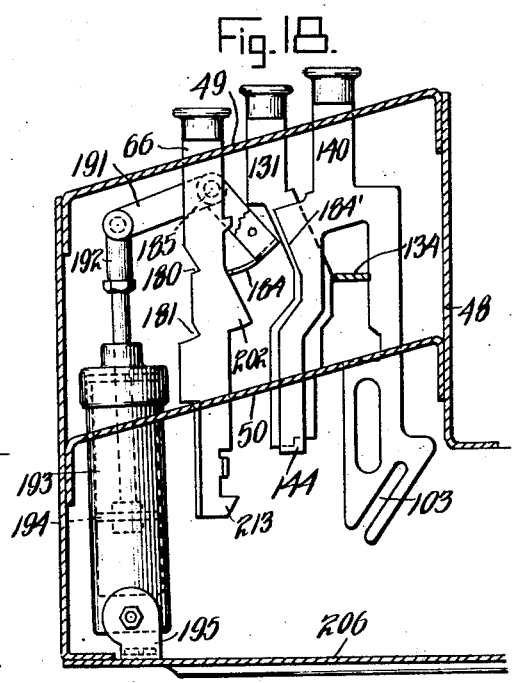
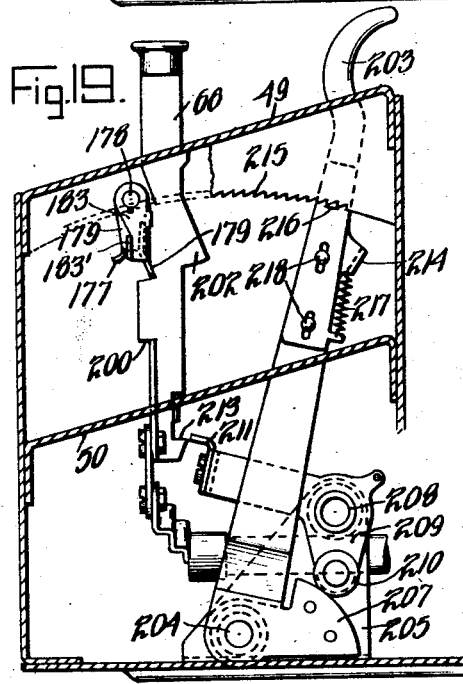
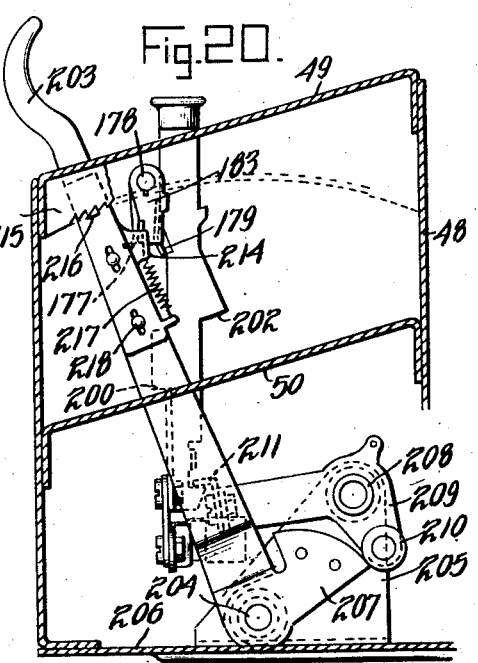
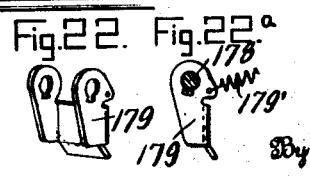
Inventor  
Donald A. Nevin March 13, 1928.
D. A. NEVIN
CARD INDEXING DEVICE
Filed Feb. 20, 1925
1,662,534
11 Sheets-Sheet 10
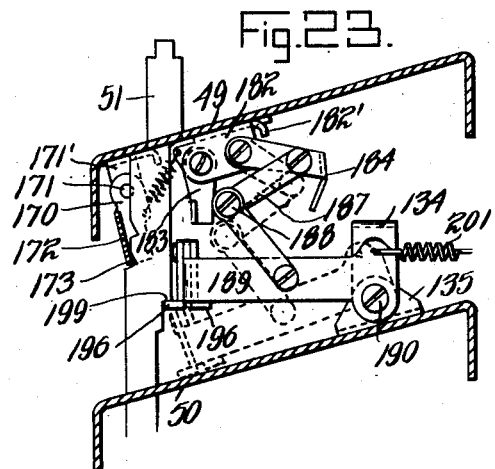
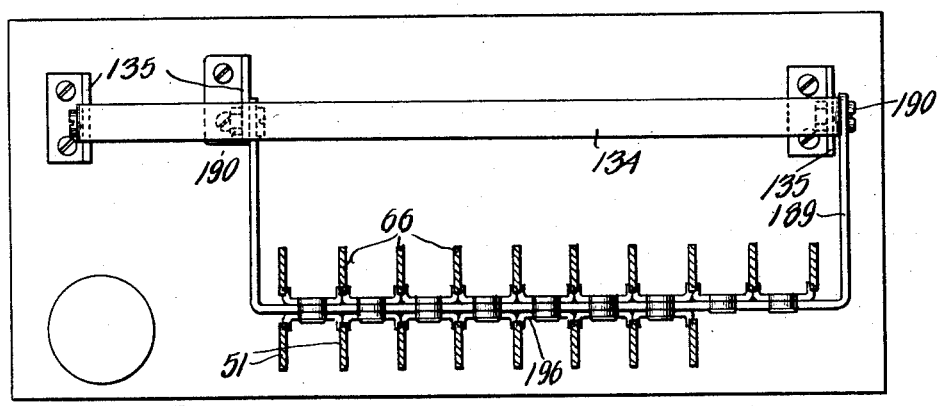
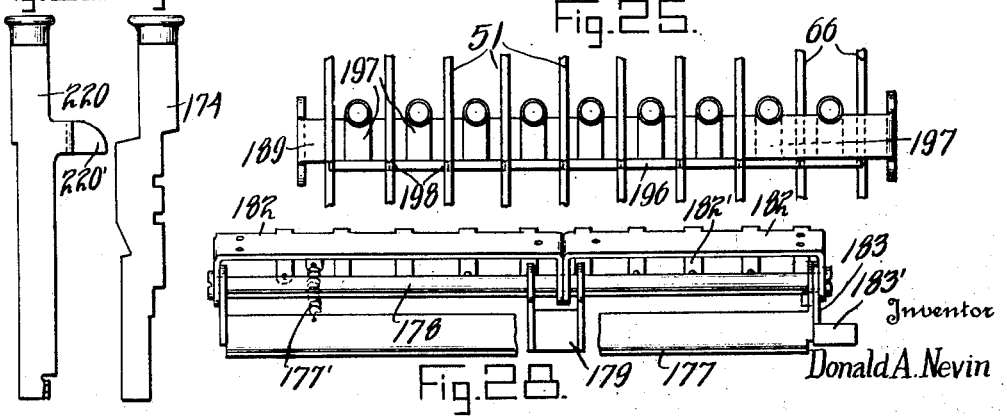
Inventor
Donald A. Nevin
By
Attorney March 13, 1928. 1,662,534
D. A. NEVIN
CARD INDEXING DEVICE
Filed Feb. 20, 1925 11 Sheets-Sheet 11
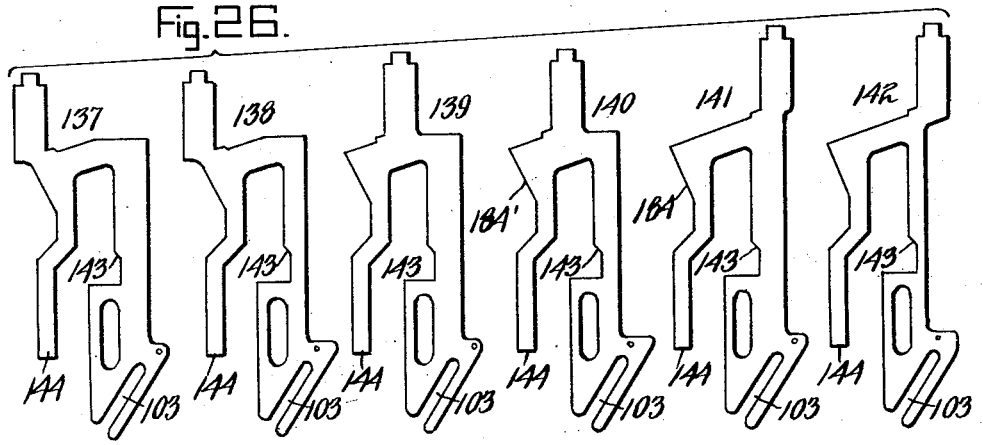
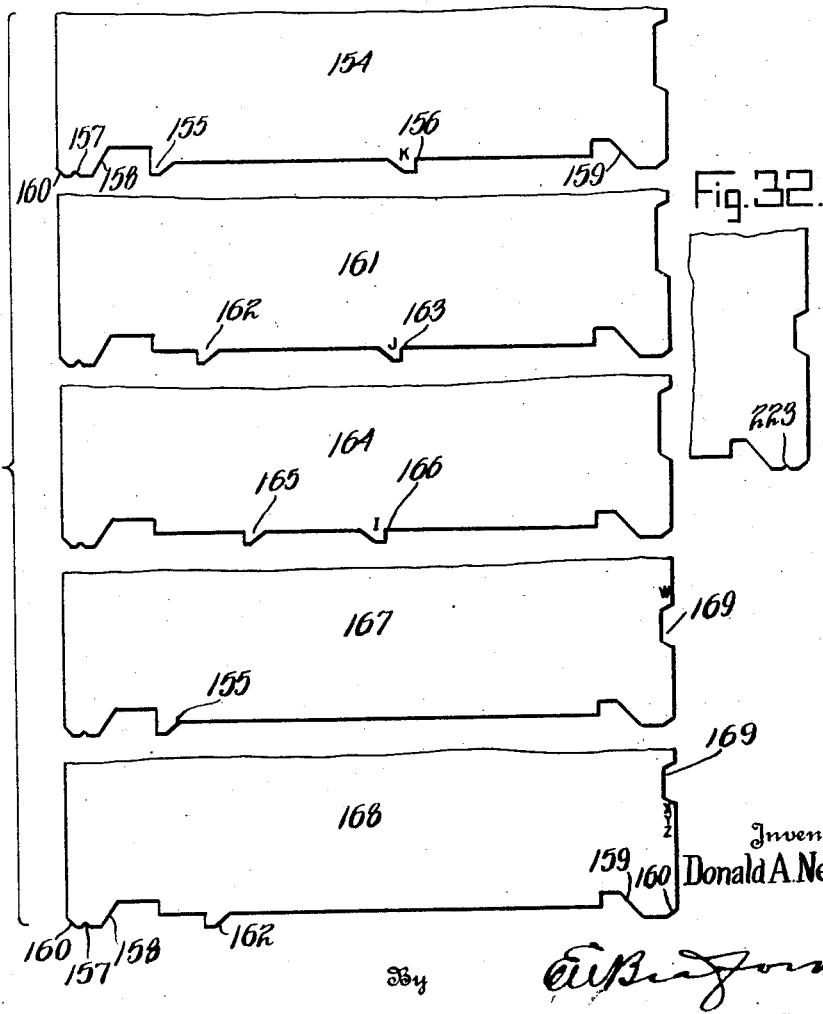
Inventor
Donald A. Nevin
By
Attorney Patented Mar. 13, 1928.

1,662,534

UNITED STATES PATENT OFFICE.

DONALD A. NEVIN, OF WAYNESBORO, PENNSYLVANIA, ASSIGNOR TO AUTODEX COMPANY, OF WAYNESBORO, PENNSYLVANIA, A CORPORATION OF PENNSYLVANIA.

CARD-INDEXING DEVICE.

Application filed February 20, 1925. Serial No. 10,712.

My said invention relates to a card indexing device and it is an object thereof to provide a device of the character described by means of which a single card or a group of cards may be selected out of a large number of cards in a tray or container in a manner which is expeditious and certain.

A further object of the invention is to provide means whereby cards may be selected and returned to position without the use of indicators extending above the upper ends of the cards as is customary in card indexes.

A further object of the invention is to provide means for bringing selected cards into projected position relatively to the remaining cards in a tray by means which shall have a minimum tendency to injure the cards. In various card indexing systems heretofore in use means have been employed for projecting selected cards by acting forcibly against small tabs or projections on the cards in a manner such that the projections soon became crumpled and broken, thus necessitating replacement of the card.

Another object is to provide improved means for projecting a card in two directions together with means for returning a projected card in one direction.

Figure 4:
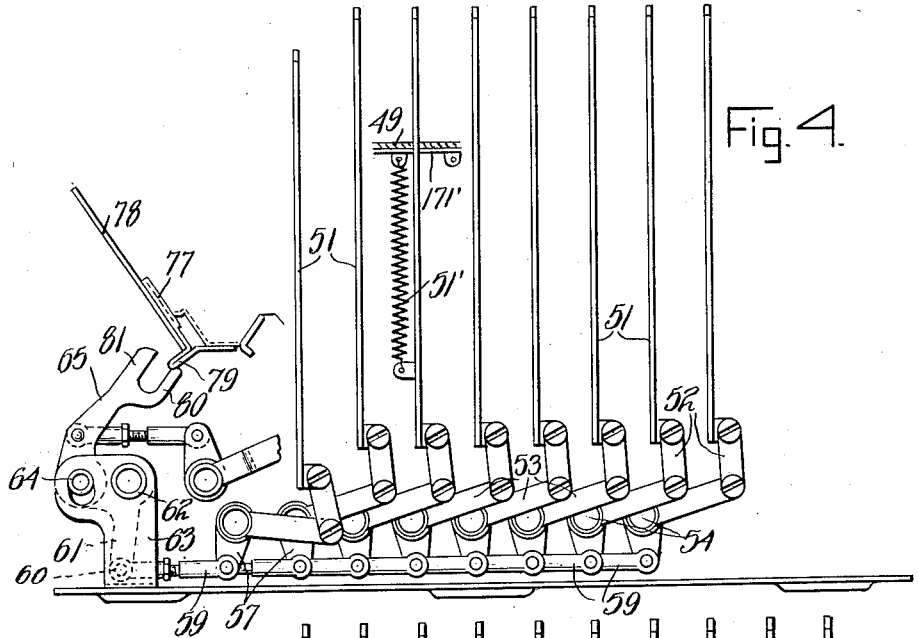
Figure 5:
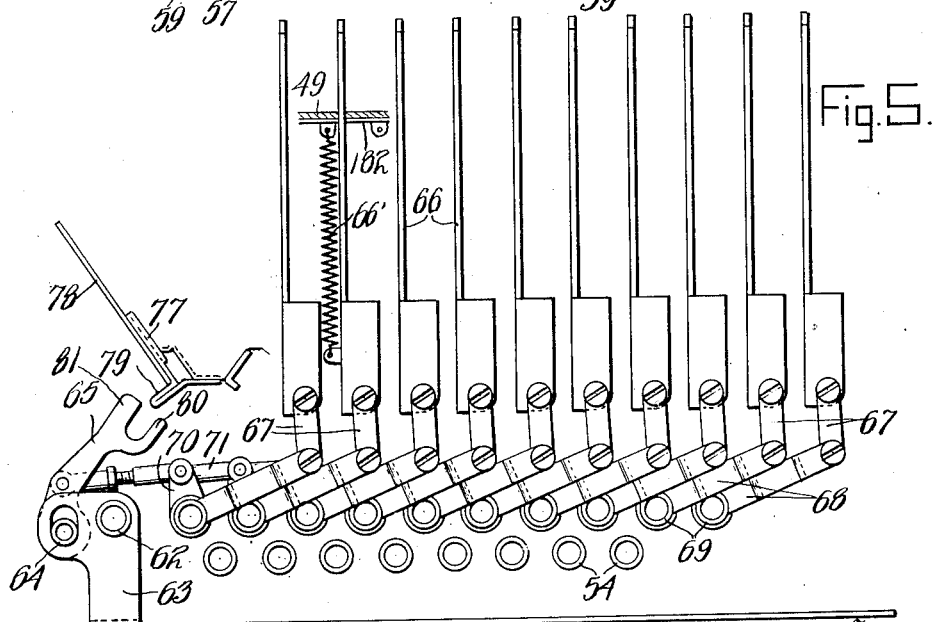
Figure 6:
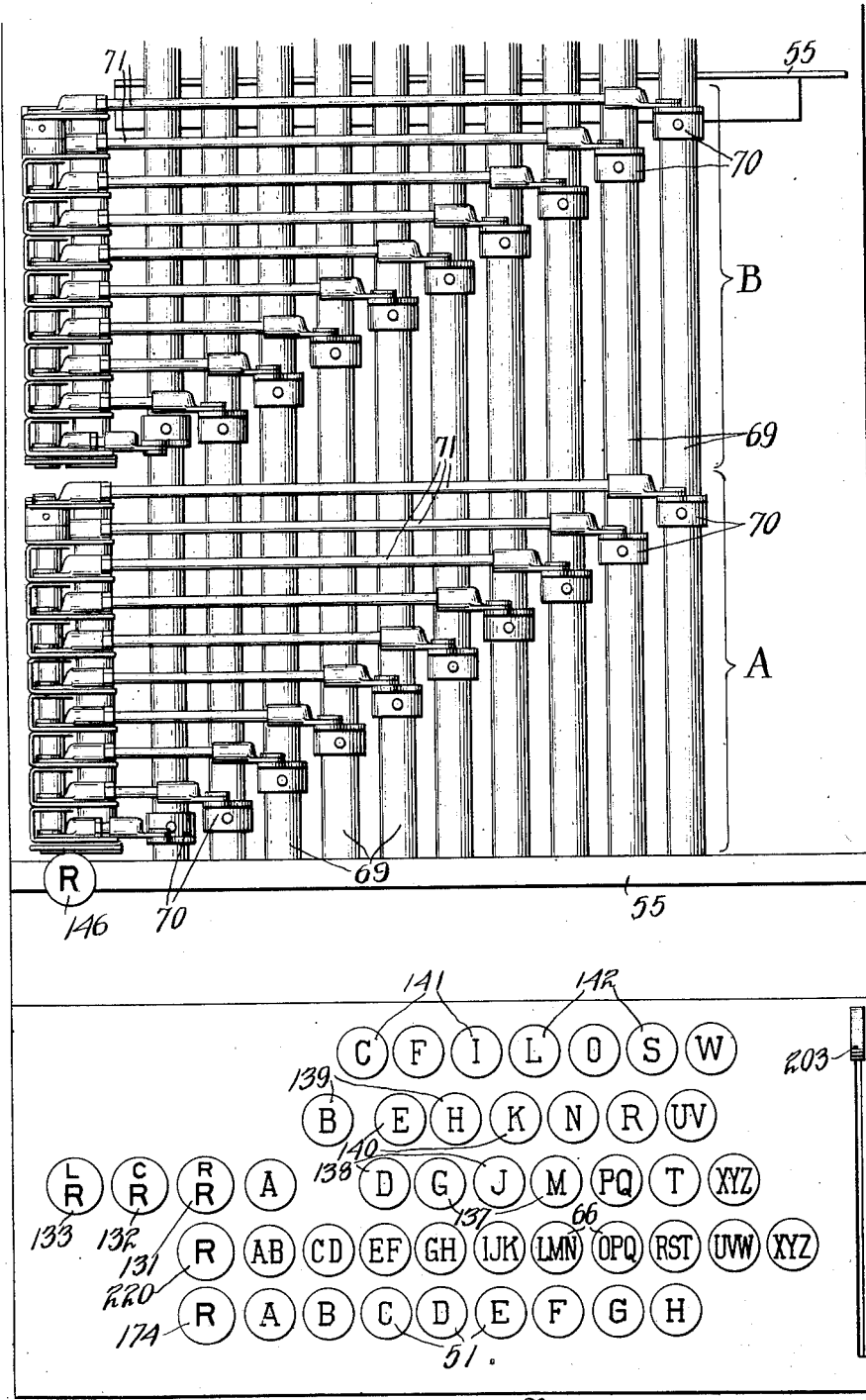

Referring to the accompanying drawings which are made a part hereof and on which similar reference characters indicate similar parts, Figure 1 is a perspective showing a part of the mechanism embodying my improvements, Figure 2, is a detail of a modified key board, Figure 3, a side elevation of the device with parts broken away to show the internal construction, Figure 4, a transverse section approximately on line 4—4 of Figure 3, Figure 5, a transverse section approximately on line 5—5 of Figure 3, Figure 6, a fragmentary section on line 6—6 of Figure 3, Figure 7, a similar section on line 7—7 of Figure 3, Figure 8, a transverse section on line 8—8 of Figure 3, Figure 9, a side elevation of selection rails shown in Figure 8, and actuating means therefor, Figure 10, a similar view of rejection rails shown in Figure 8, and actuating means therefor, Figure 11, a detail view illustrating the different forms of rejection keys, Figure 12, a plan of the rejection rails shown in Figure 10, the actuating keys being shown in cross-section, Figure 13, an assembly view of a card holder showing its relation to certain actuating mechanisms for the cards therein contained, Figure 14, a detail of operating mechanism for the selection rails shown at the right-hand side of Figure 13, Figure 15, a side elevation of a group of card-holders and the immediate actuating mechanism therefor, Figure 16, an end elevation of parts shown at the right-hand side of Figures 8 and 13 and connections between them, Figure 17, a detail side elevation of certain operating keys, Figure 18, a similar view showing a different position of the parts, Figure 19, a similar view showing a return lever, Figure 20, a view similar to Fig. 19 showing the parts in a different position, Figure 21, a detail of a lock bar shown in Figs. 19, 20 and 28, Figure 22, a detail of a detent shown in said figures, Figure 22ª, a side elevation of said detent, Figures 23, 24 and 25 are details of interlocking mechanism for the various banks of keys shown in Fig. 6, Figure 26, a detail view showing various keys differing slightly in shape, used in the third, fourth and fifth rows of keys shown in Figure 6, Figure 27, a detail showing different forms of cards used in a card index of the type herein disclosed, Figure 28, a perspective of locking devices shown in Figs. 19 and 20, with parts broken away, Figure 29, a detail of a retain key also indicated in Figs. 1 and 6, Figure 30, a detail of a retain key for the keys of the front row, Figure 31, a detail of a guide for a card-holder, and Figure 32, a card of modified form.

The device of my invention comprises a card-holding tray 45 which is removably positioned upon a box or case 46 containing card selecting mechanism and is held in place by dowel pins (not shown) so that one tray can readily be lifted off and another one substituted therefor, it being contemplated that three trays shall ordinarily be used with one mechanism case, though any number may be used. The mechanism case has an upward extension at its forward end including a front plate 47, a rear plate 48, a top plate 49 and an intermediate guide plate 50 (Fig. 9).

In the drawings reference character 45 indicates the tray or container for the cards which are arranged in divisions or groups corresponding to the keys in the front row on the key-board, said groups being here marked correspondingly to the keys. The groups are divided into sub-groups indicated by the lines dividing the groups A, B, etc., each sub-group being held in a card holder as hereinafter described and the sub-groups corresponding to the keys in the second row on the key-board. The individual cards in each sub-group are made by appropriate means to have operative connection to the respective keys in the third, fourth and fifth rows of the key-board.

It will be understood by those skilled in the art that the keys may be marked in various ways for making the device applicable to other systems of filing as by different alphabets or numbers, or by geographical, phonetic, chronological or symbolic indicia. In the illustrative example here shown the keys are lettered and the sets or rows may be taken to indicate initials or other letters of different parts of names of persons, the first row being lettered to indicate the initials of surnames, the second row the initials of first Christian or given names and the third, fourth and fifth rows indicating initials of second or middle names. In cases where there is no middle name the first two letters of the family name and the first letter of the given name are used in indexing the corresponding card, as for example a card for John Doe would be filed under the letters D. O. J., whereas a card for John A. Doe would be filed under the letters D. J. A. as is customary in card indexing systems for alphabetical filing. Where more than two given names occur all but the first and second are ignored. In case of a single name such "Tiffany's" the first three letters are used.

First selection.

The mechanism for selecting a group or division of cards includes keys 51 (Figs. 3 and 4) said keys being slidably mounted in slots in the upper plate 49 and the lower plate 50 (Fig. 3), and being returned by springs 51'. Links 52 connect the keys to rockarms 53 on rockshafts in the form of tubes or hollow rods 54 (Fig. 7). These rods are arranged in a horizontal bank, each rod being journaled in transverse bearing plates 55 and they vary in length, the longest being at the right-hand side of the tray and controlling group H while the shortest is at the left-hand side and controls group A. The plates 55 occur at intervals throughout the length of the container. Collars 56 on the rods hold them against endwise movement relatively to the cross-bars. Each rod is provided with downwardly-extending rockarms 57 secured thereto in any convenient manner as by means of integral collars 58, and links 59 extend from the rockarms 57 toward the left side of the tray where they are connected in pairs to tie rods 60 (Figs. 7 and 15). Each of the tie rods is attached at its ends to rockarms 61 depending from a hollow pivot bar 62 supported on brackets 63 (Figs. 4, 15). The rockarms 61 have integral therewith, or secured thereto in any convenient manner, laterally extending rockarms carrying a tubular lift rod 64 for a plurality of clutches 65.

It will be evident from the foregoing that depression of a key in the front row, the keys of said row being hereinafter referred to for convenience as eliminating keys, will swing its rockarm 61 to the left through the connections just described and lift the rod 64 of the group or division corresponding to said key thereby raising the clutches for the card-holders of all the sub-groups in the corresponding group or division from the position indicated in Fig. 5 to that indicated in Fig. 4, the one figure indicating the inoperative position of the clutches and the other the operative position of the clutches relative to the card-holders. Assuming that the card of Byron K. Douglass is sought, key D will have been depressed and all the clutches of the fourth group of card-holders will have been raised.

At the end of the first row there is a release key 174 similar to keys 51 (hereinafter described) except for omission of the upper notch 172, this being left off to prevent accidental locking of all the keys in the row by simultaneous depression of them. As shown, the release key can never be locked down.

Second selection.

The selection of the appropriate sub-group in the groups A, B, etc., indicated in Figs. 1, 6 and 7, is effected by the keys of the second row on the key-board indicated at 66 in Figs. 3 and 5 and conveniently referred to as positioning keys as they position the card-holders. Springs 66' serve to return the keys. These keys have flanges at their lower ends for pivotal attachment of links 67 connected at their other ends to rock-arms 68 fixed to rockshafts 69 (Figs. 3, 5 and 6) in the form of hollow rods. The rods 69 are arranged in a horizontal bank above the rods 54, and are similarly journaled in bearing plates 55. Upwardly extending rockarms 70 are arranged on said rods in groups corresponding to the groups or divisions of cards and these rockarms are connected to the respective clutches 65 by adjustable rods 71 progressively increasing in length as clearly shown in Figure 6.

It will be evident that depression of a key, for example, the one indicated at A B in the second row, will act through the connections described to rock the clutch in each group corresponding to the card holder containing the cards in which the first Christian name begins with either of the letters A or B, and pull the corresponding card-holder to the right and downward into offset position with relation to the remaining holders and their cards. The card-holders will be actuated, however, only in the group or groups corresponding to a previously actuated key in the first row of the key-board, for the reason that the clutches in the remaining groups have not been lifted from the idle position of Fig. 5 to the position of Fig. 4. Therefore if the search is for Byron K. Douglass, the clutch of the card-holder A B in the D group will be actuated to move the sub-group including such names as have surnames beginning with D and first names beginning with A or B.

*Third selection: card-holders.*

The card-holders comprise side pieces 72 and 73 (Figs. 8, 13, and 15) connected at one end to an inclined shoe having two parallel parts 74 and 75 (Fig. 13) with a horizontal ledge connecting them having an upward projection at 76. The parallel portions 74 and 75 are fixed in any convenient manner to a slide 77 mounted for up and down movement on an inclined shelf 78 and having a lateral projection 79 for engagement by the arms 80 and 81 of the clutch corresponding to the respective card-holder (Figs. 4, 5, 13). The shelf 78 provides one track on which the card-holder slides downward under the influence of the clutch and a spring 82 serves to return the card-holder.

An inclined shelf 83 at the other side of the card-holder (Figs. 13, 31) is fixed parallel to the shelf 78 and provides a track for a shoe 84 similar to that at 77, the shelf being provided with screws 85 projecting through a slot in the shoe for guiding the card-holder thereon. Similar provision may be made on the shelf 78, or any other convenient or desirable guiding means may be provided. The sides of the card-holder at the right-hand end are connected by a bottom piece 86 of irregular shape extending down along the shoe 84 and secured thereto, then horizontally and then upward alongside an angle brace 87 forming a part of and movable with the card-holder (Fig. 31). At the left-hand side of Fig. 13 an angular stop rail 88 indicates the lowermost position of the cards which strike against this stop with surfaces inclined to correspond to the inclination of the stop. The card-holders are located between partitions 89, preferably of sheet metal, extending up above the sides of the tray 50, as indicated in Figure 3 so as to separate the cards of one holder from those of another for convenience in returning them to the holders which partitions are secured by means of rivets 91 to cross-braces 92 in the form of flat bars which extend across the tray and are permanently attached in appropriately spaced relation to the side walls 94 of the tray by means of brackets 93. The brackets 93 are here shown as fixed to the side members 94 at the upper part of the tray by means of screws 95 and the shelves 78 and 83 are connected to longitudinal angle irons 96 and 97 by brackets 98 and 99 forming parts of hanger plates extending into the tray and secured to the angle irons and to the side members 94 by screws 100 or other suitable means to hold the framework together, or the shelves may be each in one piece with its supporting brackets, if preferred. Lugs 99' secure the hanger plates to the shelves and the stop rail. The higher sides 72 of the card-holders fit at their upper ends between partitions 89 and cross-braces 92 and overlap the shorter sides 73 of adjacent card-holders, thus providing guiding means for each side, and covering the upper edges of the sides of the card-holders to prevent damage to the cards by striking against the sides of the holders when being placed therein.

The position assumed by a card-holder and by the cards therein are illustrated in Figs. 13 and 15. The solid lines show the normal positions of parts except in so far as certain concealed parts are indicated in dotted lines. As the card-holder slides diagonally downward and to the right it first passes to the position indicated at $a$, (in dotted lines in Fig. 13) and then continues on to the position indicated at $b$. When the card-holder reaches the position indicated at $a$ the cards whose normal position is indicated at $c$ will have moved to the position indicated in lines partly solid and partly dotted at $d$ at which position the diagonal face at the lower left corner of the card strikes the stop rail 88 and prevents further downward movement.

The movement of the card-holder has not been interrupted, however, and this continues to move down to the position indicated at $b$ whereupon by means hereinafter explained one or more cards are selected and moved to the left so as to bring their lower horizontal edges to rest upon horizontal ledges 101 and 102 with a notch on the card engaging the projection 76 to prevent dislodgment of the selected card or cards. This position is indicated at $e$ in Fig. 8. When the card holder now returns the selected card or cards will be moved positively by reason of their support on ledges 101 and 102 and their engagement with projection 76 further upward and to the left into the position indicated at $f$ while the remaining cards will be returned to the position indicated at $c$ (Fig. 13).

*Third selection: selection rails.*

The means for differentiating between the cards in the holders to make the final selection between such cards comprises the third, fourth and fifth rows of keys in Fig. 6. The shanks of the keys are of various shapes as illustrated in Fig. 26 and are provided with cam slots 103 (Fig. 9) cooperating with pins 104 on cam rails 105 (Figs. 8 and 9) for moving such cam rails longitudinally of the tray or container. A spring 106 is connected at one end to a key and at the other end to a projection on the key-board 108 or the supporting casing therefor for retracting the key and consequently the cam rail.

The cam rails at the center of the tray in Fig. 8 control selection rails 109. These selection rails are spaced in a manner to correspond to tabs on the cards hereinafter described, here shown as spaced to correspond to the letters of the alphabet and are caused to swing laterally by means of small projections or bosses 110 on the cam rails engaging with the sides of V-shaped notches in the bearing plates 55 at the end of the throw of the respective cam rails, as illustrated in Figures 8 and 9, it being understood that the bearing plates may be formed; e. g., in three sections divided along horizontal planes bisecting rods 54 and 69. Lengthwise movement of the selection rails is prevented by shoulders 109' (Fig. 12) on the rails engaging with bearing plates 55. When the cam rails return to their original positions, bosses 111 similar to but longer than those at 110 swing the cam rails in the opposite direction to return the selection rails to their normal vertical planes as in Fig. 8. The selection rails have their upper parts bent laterally to provide for effective engagement with minimum injury to the tabs or the cards. It is necessary to lift the selection rails as well as to swing them laterally and this function occurs on the first movement of the cam rails by means of cam slots 112 on the cam rails engaging pins 113 on the selection rails.

The two selection rails at the extreme right in Figs. 8, 14 and 16, here shown as corresponding to the letters W and XYZ, have a special purpose and therefore I provide slidably mounted bars 114, 115 above the respective rails and omit the lateral bosses. The cam-rails 105' corresponding to these bars are very short (Fig. 14) as are also the selection rails 109' but otherwise may be like those in Fig. 11. The bars are guided for up and down movement on shoulder screws 116 and are connected at their upper ends respectively to rock-arms 117 and 118 on rockshafts 119 and 120. Each of the rockshafts has a series of rockarms 121' secured to an angle iron or hanger bracket 122, 122' (Figs. 13, 14 and 16) extending the length of the tray for engagement with the edges of adjacent cards. For this purpose all the cards have notches cut at the right-hand side excepting those cards bearing names with middle initial W, X, Y or Z, and these have narrower notches with the notch for W lower than that for X Y Z so that, in effect, those cards have selective lateral tabs positioned according to said middle initials respectively, such tabs or projections extending half way across such notches in the ordinary cards, as indicated in Figure 27, so that they can conveniently be actuated by hanger brackets 122.

It will be evident from the foregoing that movement of a key in the third, fourth or fifth row of keys will slide one or more selected cards to the left to position them on the ledges 101 and 102 as e. g., the card having a tab marked K, which card is indicated at $e$ in Figure 8, and which corresponds to the middle initial of the name Byron K. Douglass. Had the initial been W or one of the set X Y Z one of the two keys corresponding to the two cam rails at the right of the figure would be actuated to move the correct card to the left. It will be understood that the special mechanism here described in connection with the letters W X Y Z may be used for other purposes in cases where the cards are large enough to provide space for all the letters at the bottom or where certain letters such as U V and P Q are combined on a card, leaving said mechanism available for other selections, such as "Paid", "Overdue" etc.

*Third selection: rejection rails.*

It will be recalled that the key in the second row taken as actuated for purposes of illustration controls first Christian or given names beginning with the initials A or B. Thus cards in the selected and offset cardholder include names of persons having first names beginning with either of said initials.

The cards now to be moved to the right and offset relatively to others in such card-holder to reject them include such cards with surname beginning with D and first name beginning with A whenever they have also the middle initial K. In order to further limit the selection I provide a set of three rejection rails at the left of Figure 8, said rails being numbered respectively 123, 124 and 125. These rails are actuated by cam rails similar to those heretofore described as actuating the selection rails of the main body but the cam rails are at the opposite or left side of the rejection rails instead of at the right and they swing the rejection rails toward the right for moving the cards, wherefore also the rejection rails have their upper ends bent to the left, said rejection rails being intended to engage tabs having vertical faces at the left-hand side instead of at the right as on the cards having selection tabs at the bottom. The first rejection rail at the left engages a tab close to the gap in the under side of the card; the second, a tab slightly further to the right hereinafter referred to as a central tab; and the last rail engages a tab slightly further to the right, hence referred to as a right rejection tab. Each card has such a tab but the cards having center rejection tabs are usually much fewer in number than the others as will presently appear.

The means for actuating the rejection rails is shown in Figures 10, 11 and 12 and comprises basket levers 126, 127, 128 mounted on a common pivot 129 suspended by brackets 129'. The basket levers are provided with springs 130 to move them into the positions indicated in Figure 10. Retain keys 131, 132 and 133 are provided for actuating the basket levers, key 131 actuating levers 127 and 128, key 132 actuating levers 126 and 128 and the key 133 actuating levers 127 and 128 thereby to actuate the corresponding rejection rails. In the case of keys in the second row having but two initials thereon the cards will have either a right rejection tab cooperating with rejection rail 125 or a left rejection tab cooperating with rail 123, whereas in the case of keys having three initials some of the cards will have central rejection tabs. In Figure 6 the keys 131, 132 and 133 are indicated as being marked respectively RR, CR and LR for right retain, central retain and left retain. On actuating any key two of the basket levers will be moved pushing on their respective cam rails, thereby first lifting the rejection rails and then swinging them to the right to act on the corresponding tabs of selected cards. It will be seen from the drawings that depression of the key 131 will operate basket levers 126 and 127, depression of key 132 will operate basket levers 126 and 128 and depression of key 133 will operate basket levers 127 and 128. The result of this is that if applicant's first name begins for example with B as in the case of Byron K. Douglass, above referred to, all the cards in the card-holder A B of group D having middle initial K will have been moved to the position indicated at e in Figure 8 and right retain key 131 being now depressed the left rejection rail and the central rejection rail will both be actuated whereby the selected cards having tabs close to the left side, i. e., the cards for names having first initial A will be moved to the right (rejected) by the rejection rail back to the position indicated at d in Fig. 8. The central rejection rail makes the same movement but all the selected cards in this AB group are provided either with a left rejection tab or a right rejection tab and therefore none are moved by the central rejection rail. In the case of keys for three initials as IJK, LMN etc. the cards bearing names with first initial J, M etc. have central rejection tabs as hereinafter explained. Actuation of the left retain key rejects (moves to the right) cards with central rejection tabs as well as those having right rejection tabs, and actuation of the central retain key rejects cards having right rejection tabs as well as those having left rejection tabs by a like movement.

If the first Christian name on the card being sought should begin with A the right retain key would have been depressed rejecting all cards with first initial B by the operation of the right rejection rail, the central rejection rail moving idly. The central retain key is actuated only when cards are to be retained having as the first initial of the desired name a letter appearing at the middle on a key having three letters and as will be evident from Fig. 12 this key operates the right and left rejection rails and retains the cards having central rejection tabs.

A buffer 134 of inverted U-shape is illustrated in Figs. 3, 10, 17 and 18, said buffer being pivoted on brackets 135, (Figs. 3 and 24). This buffer is swung toward the rear by the retain keys 131, 132 and 133 and toward the front by the selection keys (Fig. 26) the retain keys being provided with cams at 136 acting against one edge of the buffer and the selection keys 137, 138, 139, 140, 141, 142 each being provided on one leg with a cam surface at 143 for moving it in the opposite direction to the cam surfaces 136. Each of the keys has another leg 144 engaging a slot in plate 50 solely for guiding the key in its up and down movement, the keys being arranged in three rows in staggered relation to keep them as close together as are the tabs on the cards, viewed from the front. The key 142 also has a slot at 145 to accommodate its spring 106 (Figs. 3 and 9). The buffer prevents damage to the cards by simultaneous actuation of rejection and selection keys which would cause pressure in opposite directions against oppositely facing tabs on a card by the corresponding rails.

*Return mechanism.*

The mechanism hitherto described provides means for selecting first a group, then a sub-group, and then one or more cards in that sub-group which cards are provided with certain indicia and corresponding formations. For convenience in returning such cards I may provide means by which they may be pushed back to the right into line with the other cards of the set, such means being illustrated in Figs. 1, 3, 6 and 13 and comprising a return key 146 with a spring 147 for bringing it back to position after depression. The key is guided by a slot embracing a fixed pin 148 and carries a roller at 149 bearing against one end of a rockarm 150 on a hollow rockshaft 150'. Depending from the rockshaft are a series of rockarms 151 carrying an angular metallic strip or hanger bracket 151' for pressing against the end of a projected card to force it back to the right into line with the remaining cards in the card-holder whereupon it will be returned by gravity to its lowermost position. In a preferred construction a single return key actuates a single rockarm positioned as shown at 150 fixed to a rockshaft extending the length of the tray and having a plurality of depending arms which support a strip for the entire series of cards in the tray, or separate hanger brackets may be provided for the several divisions, if desired. The return mechanism is supported by brackets 152 attached to lock strips 153 secured to the brackets 93 for the purpose of retaining cross-braces 92.

*Index cards.*

In Figure 27 I have shown cards of preferred forms, the card at 154 having its lower edge cut away to provide a left rejection tab 155 and an indexing tab 156 with the letter K thereon. A slight depression at 157 is provided for coaction with the detent 76 (Fig. 13). An incline at 158 coacts with the stop 88 and an incline 159 is provided at the opposite side which fits against an incline on the card holder 86. The lower left-hand corner is beveled at 160 to provide for stopping the card at the end of its sidewise movement without damage thereto, this corner also fitting into the corner of the holder. The card at 161 is similar except that it has a central rejection tab at 162 (i. e. central with respect to tabs 155, 162 and 165) while the selection tab at 163 is positioned differently. The card at 164 has a right rejection tab at 165 and a selection tab at 166 differently positioned from those on the preceding cards. The cards at 167 and 168 have their selection tabs at one side as indicated at W and XYZ respectively. They have no selection tabs at the bottom. It will be noted that each of the cards 154, 161 and 164 has a wide notch at the right side so as to remain stationary while cards 167 or 168 are moved to the left.

*Interlocking devices.*

Locking and interlocking mechanism is provided in connection with the various banks of keys. Such mechanism includes a detent 170 pivoted at 171 on a bracket 171' for engagement with notches 172 in the forward side of the keys 51 of the first row (Figs. 3 and 23). The form of the keys is such that when any one is depressed it will be locked in lower position by the detent engaging the notch 172 but if another key of the row is depressed it will move the detent by reason of a cam surface at the upper side of a notch 173 to release the first which can then return to its upper position. The release key 174 (Figs. 6 and 28) at the end of the row, however, does not have a holding notch and consequently merely cams out the detent to release any other key or keys held by the same and then returns to position when the operator's finger is removed therefrom, this release key being used in case of error, or when all the keys are down.

At the rear side the keys 51 are provided with notches at 175 and 176 for engagement by a lock bail 177 (Figs. 3, 19, 20, 21 and 28) moved in one direction by a spring 177' attached to bracket 182. This detent is in the form of a bail extending across the tray as does detent 170 and is pivoted to swing about a rod 178. The purpose of lock bail 177 is to lock the eliminating keys 51 against movement when a positioning key is depressed, the depression of any such key serving to move the bail 177 to locking position for all raised keys of the first row by means of one notch therein and all depressed ones by another notch. Were it not for this lock bail a front row key might be depressed, unlocking another already depressed eliminating (front row) key, together with the subsequently lowered positioning (2nd row) key and the corresponding card-holding box, whereupon such card-holder could snap back to place under tension of spring 82, without dash-pot control, and with consequent shock. The rod 178 also has loosely splined thereto, as shown in Fig. 22ª, a series of detents 179 (Fig. 22) adapted to engage notches 180, 181 (Fig. 18) at the front side of keys 66 in the second row. Springs 179' are connected at one end to the detent and at the other to a hook 182' on bracket 182 (Fig. 23) for holding the detents in locking position. The arrangement of these detents is such that each one can lock its key by engagement with the upper notch 180 (the lower notch 181 serving merely to provide a clearance for the detent to permit it to engage a depressed key) but will not be unlocked by the depression of another key in the second row. The rod 178 is supported by means of brackets 182 secured to the plate 49 in any convenient manner. Unlocking means 184 for detents 179 consists in a crank 183 fixed to rod 178 by the same spline that connects the detents 179 loosely thereto (Fig. 22ª) said crank having a tail 183' projecting to the right (Figs. 19 and 28).

A dash-pot bail 184 is pivotally mounted at the rear end of brackets 182 at 185, and is moved upward by a spring 222. The bail is connected at the right-hand side of the machine by a release link 187 (Fig. 23) and a connecting link 188 to a release bail 189 pivoted at 190 on brackets 135 (Figs. 3 and 24) one of said brackets being common to bail 189 and buffer 134. The other end of the bail is rigidly connected to or integral with a rockarm 191 pivotally attached at its free end to the rod 192 of a dash-pot having a piston 194 at its lower end. The cylinder 193 of the dash-pot is pivotally mounted on bracket 195 and is preferably filled with oil. The dash-pot is located at the front left-hand corner of the box.

During ordinary operations of selection and return of cards the cam faces 184' on the selection keys (Fig. 26) and 185' on the retain keys (Fig. 11) force the dash-pot bail 184 over against the cam face 105 located above the rearward projection 202 on each positioning key that has previously been depressed (Figs. 17 and 18). The cam faces on the retain keys are at such an angle as to force the dash-pot bail down so far that the end of the release link 187 (Fig. 23) strikes the tail 183' on crank 183 and releases the detents 179 from the positioning keys. The cam faces on the selection keys may also be at such an angle when so desired as for example when the retain keys are omitted. Thereupon the spring 82 of the offset cardholder acts to return it to normal position and incidentally lifts the positioning key aided by spring 66'. Such movement is resisted by the dash-pot as the cam edge on the positioning key bears against the edge of dash-pot bail 184 and allows the key to rise only as the piston moves in the dash-pot. Obviously the downward motion of the retain keys is also cushioned by the dash-pot which acts with equal force in each direction. The cam faces 184' are so formed as to act on dash-pot bail 184 to secure the cushioning effect, but do not move the bail and the toggle links sufficiently to release the detents 179.

There are no relief valves in the dash-pot which is therefore double-acting. The purpose of the dash-pot control is to cushion the return of a lowered and offset card-holder, and the purpose of the link mechanism in Fig. 23 is to disconnect the ordinary release mechanism for the positioning keys in case more than one of them is depressed, when the restoring lever (hereinafter described) comes into use, the release link 187 being lowered by the connecting link 188 to clear tail 183' of crank 183.

The release bail 189 carries a number of rockers 196 (Figs. 3, 24 and 25) which are approximately T-shaped, each rocker having a depending portion 197 and forks 198 projecting laterally and away from the body of the bail 189. As a result the body of each key 51 and 66 abuts against one or two of said forks, depending on whether it is at the end of the row or between the ends, and upon depression of the key a shoulder as at 199 and 200 (Figs. 17, 19, 20 and 23) cams the adjacent rocker or rockers aside and forces the respective forks underneath the similar shoulders on the remaining keys so as to prevent effectually the depression of any other key in the series without also carrying down the bail 189 to the position shown in dotted lines in Figure 23. This means that the bail and all the rockers are moved down as a unit by depression of more than one key in either the first or the second row.

When more than one key in either of the first two rows is depressed carrying down the bail 189, which is provided with a spring 201 for returning it to position, the toggle links 187, 188 assume the position shown in dotted lines (Fig. 23). Subsequent depression of selection keys or retain keys has the same effect upon the dash-pot bail 184 as before, but the toggle links now act in a lowered position and do not release detents 179. For this reason the positioning keys cannot be released from their lowered locked situation since the front end of the link 187 cannot reach the tail 183' of the releasing device for the detents 179.

*The restoring handle or lever.*

In order now to release the lowered positioning keys it is necessary, after such operation of selection or retain keys as may be needed, to swing a restoring lever 203 having a handle projecting through a slot in top plate 49 from the position illustrated in Figs. 1, 3 and 19 into that of Fig. 20. This lever is secured to a rockshaft 204 removably mounted in a pair of brackets 205 fixed to the floor 206 of the machine and has integral therewith a rearwardly extending arm 207, a similar arm being secured to the opposite end of the shaft. The arms are shaped at their ends as cams with surfaces receding from the axis of the rockshaft toward their lower or rearmost points. A rockshaft 208 is mounted higher up in the pair of brackets 205 and carries a pair of bent levers 209 with rollers 210 at one end bearing on cams 207 and a downhold 211 secured to both levers at the other end. A spring 212 (Fig. 3) secured at one end to a projecting lug on one of the bent levers and at the other end to a fixed part of the machine serves to hold the rollers 210 in engagement with their cams.

The positioning keys are provided at their lower ends with notches forming hooks 213 for engagement by the projecting flange of the downhold 211 and it follows therefrom that when the lever is pulled forward into the position of Figure 20 it throws the flange into engagement with the upper faces of the hooks on the positioning keys and may pull them down to a slight additional degree to permit easy retraction of the detents 179. Near the end of the stroke of lever 203 a lateral ear 214 thereon strikes the tail 183' of the releasing crank for the detents 179 of the positioning keys and moves them all out of locking position. The reason for this additional mechanism resides in the fact that when more than one positioning key is depressed the cumulative force of the springs 82 on the card-holders offset and lowered thereby would be too great to be successfully cushioned by the dash-pot and the card-holders would be thrown back with such force as to displace the selected cards and interfere with the successful operation of the entire mechanism. If the lever 203 were released and allowed to fly back under the impulse of the several springs directly, the same result might accrue. To insure that the operator cannot do this but must let the lever back slowly a rack segment is provided at 215 for co-action with the detent 216 here shown as being in the form of a lug on the separate upper portion of the lever. This upper portion is slidable on the lower and is normally forced upward by a tension spring 217, the respective lever portions being formed with pins 218 and corresponding slots so that the upper part can slide up and down on the lower. If the operator's hand is removed from the lever 203 as it starts backward the spring immediately throws the detent 216 into engagement with rack segment 215 and stops the movement of the lever thereby stopping the upward movement of the positioning keys and of the card-holders. Another use for the restoring lever occurs in connection with selection of sub-groups. It is easier and more convenient to depress several positioning keys simultaneously part-way and then actuate the restoring handle to complete the depression than to press each one completely down with the fingers.

A release key 220 is provided at one end of the row of positioning keys (Fig. 6). The shape of this key is shown in Fig. 29, where a horn 220' extends over dash-pot bail 184. By using this release key it is possible to release a detent 179 and allow the positioning key and its card-holder to return under dash-pot control in case of error or when it is not desired to use the retain keys.

The device thus far described is intended as one section of a card index containing surnames having initials from A to H. Obviously it might be used for a much smaller fraction of a larger index the one tray having for instance only surnames with a single initial as B which might be divided on the first row of keys into Ba, Be, Bi, etc. or in other ways. In many cases a single section will be sufficient for the needs of a business and for such cases I have provided an attachment shown in Fig. 2 consisting of a strip 221 adapted to be secured to the top plate 49 in front of the keys by means of screws or otherwise. This strip is provided with a series of openings and with means at the front by which cards may be slipped into position underneath the openings, which cards may be lettered as indicated in the figure so as to take care of all the cards of a set in a single tray. The tray here shown is intended to contain about 1000 cards in eight divisions of not over 150 cards each. Each division or group forms ten sub-groups of about twelve to fifteen cards which are held in a card-holder or box.

*Placing cards.*

The machine herein described is a means for quickly filing as well as for finding cards. Suppose, for example, a card for J. B. Eader is to be filed, the process is as follows, (a) depress key E in first row, thus setting the clutches in the E section of the tray; (b) depress key J in the second row thus offsetting and lowering the J box in the E section and at the same time indicating in what box the card is to be filed. It is immaterial where a card is filed in the particular holder as the transverse location of the tab on the card identifies it regardless of the arrangement of the cards in the holder. This permits rapid filing and eliminates the necessity of markers arranged along the tray for assistance in filing.

*Finding a lost card.*

If a card (or cards) should be misfiled in any part of the tray it may be quickly located mechanically by the use of my device in the following manner, (a) depress all the keys in the first row, thus positioning all clutch levers to offset their card-holders with reference to the tray (b) depress all keys in the second row thus lowering and offsetting to the right all card-holders and therefore all cards in the tray (c) depress a selection key corresponding to the initial of the second given name (or corresponding letter as above explained) on the lost card, as for example in seeking the card for Landis, M. H. depress the H key in the fourth row so as to offset to the left all cards in the tray having an H tab extending from the lower edge (d) noticing that the initial of the first given name in the case suggested is M observe that M is the central letter of a key in the second row, therefore depress the central retain key whereupon all cards which have thus far been selected and which do not have as initial of the first given name the letter occurring in the center of the actuated positioning key will be rejected (in this example only those cards having initials J M P S V Y for the first Christian name will remain in selected position) (e) restore the card-holders to the normal position by the use of the restoring lever. The lost card may then quickly be located with the eye as only a few cards will remain raised above the mass.

It will be obvious to those skilled in the art that the lettering on the keys may be changed to suit them to various kinds of business. Extra keys may also be added for such purposes, the number being limited only by the size of the cards to be filed in the tray. The number of keys shown in the drawings may be reduced by omission of such as are not needed. It will be evident that selection keys for the months of the year could be added for use in banks to find the date on which notes become due or for use in insurance offices where the machine would locate a card either alphabetically or according to the month in which the premium on the particular policy might be due. Such a device would be operated by depressing all of the keys in the first and second rows, then the keys for the month of the year, and then actuating the restoring handle without operating the retain keys, thereby for example finding all the cards having a tab in a particular month regardless of their alphabetical filing. Various ways of using the device for numerical filing or for keeping a sales record or for adding a calendar attachment for chronological filing, etc. will occur to those familiar with devices of this character.

It may be mentioned that in cases where my device has been adapted for numerical filing there is an advantage in the presence of the retain keys, in that they enable the use of the device for selection between cards having different affixes to their numbers, e. g. in a telephone exchange where one card may be 985-j and another 985-w, both cards would be offset by the selecting mechanism and then one of them could be rejected by the use of the appropriate retain key.

If preferred the ledge 101 and projection 76 may be omitted and a card may be used as shown in Fig. 32 having notches at 223 instead of those at 157, (Fig. 27) the manufacture of the bottom of the card-holder being somewhat simplified in this way. It is entirely feasible to omit release key 220 without interfering with the operativeness of the device. The rockers 196 at the rear side of bail 189 may also be omitted for simplicity and economy, the retain keys may be omitted in a purely numerical system, the keys may carry indicia of more than one set, as a letter and a numeral in combined systems where cards are found both by alphabetical and numerical means, and in general the device as shown and described may be modified in many ways without departing from the spirit of the invention. Therefore I do not limit myself to what is shown in the drawings and described in the specification but only as indicated in the appended claims.

Having thus fully described my said invention, what I claim as new and desire to secure by Letters Patent, is:

1. A card-indexing device comprising a container, cards in the container divided into groups and sub-groups, means for selecting a group, means for selecting a sub-group in said group, means to isolate a plurality of cards from the sub-group, and means to reject certain of the cards so isolated, substantially as set forth.

2. A card-indexing device as in claim 1, said rejecting means acting on selective projections of one or more of the cards so isolated, substantially as set forth.

3. A card-indexing device comprising a container, cards in the container divided into groups and sub-groups, means for selecting a group, means for selecting a sub-group in said group, means to isolate a card in the sub-group by acting on an irregularity at one edge of the card, and means to complete such isolation by pressure against another edge on the card, substantially as set forth.

4. In a card index, a card having along one edge a selective projection with a working edge facing in one direction, and another selective projection with a working edge facing in another direction, substantially as set forth.

5. In a card index, a card having along one edge a selective projection with a working edge facing in one direction, and another selective projection with a working edge facing in the opposite direction, substantially as set forth.

6. In a card index, a card cut away along one edge to provide tabs with opposed edges inclined toward the center of the card and a notch between one of said edges and the adjacent corner of the card, substantially as set forth.

7. In a card-indexing device, a container, cards in the container divided into groups and sub-groups, holders for the sub-groups, inclined shelves supporting said holders, rockarms for engaging said holders to move them on said shelves, means for moving the rockarms selectively into engagement with the holders, and means for moving the engaged rockarms, substantially as set forth.

8. A card-indexing device as claimed in claim 7, the means for moving the engaged rockarms being selective, substantially as set forth.

9. A card-indexing device as claimed in claim 7, with means for selectively moving individual cards in the holders, substantially as set forth.

10. A card-indexing device as claimed in claim 7 the means for moving the engaged rockarms being selective, and means for selectively moving individual cards in the holders, substantially as set forth.

11. In a card-indexing device, a container, cards in the container divided into groups and sub-groups, means for selecting a group, means for selecting a sub-group in the group, selection rails for moving individual cards in the sub-groups, and means for moving said cards selectively bodily upward and then laterally with regard to the container, substantially as set forth.

12. In a card-indexing device, a container, cards in the container divided into groups and sub-groups, means for selecting a group, means for selecting a sub-group in the group, selection rails for moving individual cards in the sub-groups, and rails movable lengthwise of the casing having cams to swing the selection rails laterally, substantially as set forth.

13. In a card-indexing device, a container, cards in the container divided into groups and sub-groups, means for selecting a group, means for selecting a sub-group in the group, selection rails for moving individual cards in the sub-groups, and rails movable lengthwise of the casing having means engaging the selection rails to lift them into position to actuate their respective cards, substantially as set forth.

14. In a card-indexing device, a container, cards in the container divided into groups and sub-groups, means for selecting a group, means for selecting a sub-group in the group, and means for selecting a card in the sub-group including selection and rejection rails movable up and down in the container, substantially as set forth.

15. In a card-indexing device, a container, cards in the container divided into groups and sub-groups, means for selecting a group, means for selecting a sub-group in the group, selection and rejection rails for moving individual cards in the sub-groups, and means for moving said selection and rejection rails selectively bodily upward and then laterally with regard to the container, substantially as set forth.

16. In a card-indexing device, a container, cards in the container divided into groups and sub-groups, means for selecting a group, means for selecting a sub-group in the group, selection and rejection rails for moving individual cards in the sub-groups, and rails movable lengthwise of the casing having cams to swing the selection and rejection rails laterally independently of each other, substantially as set forth.

17. In a card-indexing device, a container, cards in the container divided into groups and sub-groups, means for selecting a group, means for selecting a sub-group in the group, selection and rejection rails for moving individual cards in the sub-groups, and rails movable independently lengthwise of the casing having means engaging the selection and rejection rails to lift them into position to actuate their respective cards, substantially as set forth.

18. In a card index, a tray, means for isolating a number of successively arranged cards, cam rails movable lengthwise of the tray, and selection rails movable into selective engagement with the cards by said cam rails, substantially as set forth.

19. In a card index, a tray, means for isolating a number of successively arranged cards, selection rails for offsetting cards in the isolated set selectively, cam rails movable lengthwise of the tray, and rejection rails movable into selective engagement with the cards by said cam-rails, substantially as set forth.

20. A card index as in claim 18, with means for moving the selection rails laterally to offset the selected cards, substantially as set forth.

21. A card index as in claim 19, with means for moving the rejection rails laterally to isolate further the selected cards, substantially as set forth.

22. A card index as in claim 19, with means for moving the rejection rails laterally to isolate further the rejected cards, a plurality of selective rejection rails, and disjunctive operating means each serving to actuate all but one of said rejection rails, substantially as set forth.

23. In a card index, a container, a plurality of card-holders therein, means for selecting individual card-holders and offsetting them relatively to the container, resilient means for returning such card-holders, and means for cushioning the return movement, substantially as set forth.

24. A card index, as set forth in claim 23, with automatic cushioning means operative on the return of a single card-holder, and manually operated means for controlling the return of a plurality of card-holders, substantially as set forth.

25. A card index as set forth in claim 23, with automatic cushioning means operative on return of a single card holder and manually operated means for controlling the return of a plurality of card holders, and means for automatically rendering the second cushioning means operative on selective movement of more than one card-holder, substantially as set forth.

26. In a card index, a row of selecting keys, individual locking means for said keys, means acting resiliently to return said keys, means proportioned to cushion the return of any individual key, manually operable means for controlling the simultaneous return of a plurality of keys, and means operated by depression of more than one key in the row for rendering the cushioning means inoperative and the controlling means operative, substantially as set forth.

27. A card index as in claim 26, with hooks at the lower ends of the keys, an oscillatory downhold for all of said hooks, and a hand lever controlling the return movement of the downhold, substantially as set forth.

28. A card index as in claim 27, with a detent on the lever, a rack for engaging the detent, and means tending to engage the detent and the rack, substantially as set forth.

29. In a card index, a plurality of rows of keys, a common detent for the keys of the first row, means on each key for moving the detent to release any other depressed key, and a release key at one end of the row for releasing all of the keys in said row, substantially as set forth.

30. In a card index, a row of keys, individual locking means for said keys comprising individual stirrups loosely keyed to a shaft, common means for unlocking all of said keys comprising a long stirrup acted upon by any of said individual stirrups, and a key for actuating the shaft, substantially as set forth.

31. In a card index, a row of keys for making a preliminary selection, a row of keys for making a secondary selection, and means operable by any key in the second row to lock in place all keys in the first row, substantially as set forth.

32. In a card index, a plurality of keys for selecting one set of cards out of a series arranged in sets, a plurality of keys for selectively offsetting cards in the selected set, a plurality of other keys for rejecting certain selected cards in a selective manner, means for locking in actuated position a key in the first set, and means operable by a key of the last set for releasing the keys of the first set, substantially as set forth.

33. In a card index, a plurality of keys for selecting one set of cards out of a series of sets by a movement in one direction, individual resilient means for returning the keys, individual means for locking them in actuated position, common means for cushioning the return movement, means for offsetting selected cards in said set, and connections from said offsetting means for placing said cushioning means in active position, substantially as set forth.

34. A card index as in claim 33, with means for selectively rejecting selected cards, said means also releasing the locking means, substantially as set forth.

35. In a card index, a set of selecting keys, individual means for locking them in actuated position, individual means tending to return them, common cushioning means for the return movement, said means being normally free from the keys, and means for placing such cushioning means in operative relation to an actuated key, said means also unlocking said key, substantially as set forth.

36. A card index as in claim 35, with manual means for controlling the unlocking and return of the keys, and means set in motion by projection of more than one key for rendering the cushioning and coacting unlocking means inoperative and the manual controlling means operative, substantially as set forth.

37. A card-indexing machine comprising a container for cards, independent means operative selectively on different edges of the cards to move them to one side, a rock-shaft at one side of the container, a key for actuating the rock-shaft, arms depending from the shaft, and means on said arms for engaging the adjacent edges of the cards to return them to place, substantially as set forth.

38. In a card index, a tray, cards therein, certain of which are provided with notches at one side, and means movable toward said cards from said side for moving them endwise whereby appropriately notched cards may remain stationary while other cards are offset, substantially as set forth.

39. A card index as in claim 38 with other cards having selective irregularities along the bottom edge, rails beneath the cards for moving selected cards sidewise, cam-rails movable endwise of the tray for operating said first-named rails, a keyboard, keys thereon for operating the cam-rails, and connections from certain of said cam-rails to said rockarms, substantially as set forth.

40. In a card indexing mechanism, a tray for holding a set of cards, a supporting case on which the tray is removably mounted, and means in the case for offsetting cards selectively laterally from the set, substantially as set forth.

41. In a card indexing mechanism, a tray for holding a set of cards, a supporting case on which the tray is removably mounted, means in the case for offsetting cards selectively from the set, and means on the tray to move them back toward normal position, substantially as set forth.

42. In a card indexing mechanism, a tray for holding a set of cards, a supporting case on which the tray is removably mounted, means in the case for offsetting cards laterally, and pins for guiding the tray into correct position on the case relatively to the offsetting means, substantially as set forth.

43. In a card indexing mechanism, a tray for holding a set of cards, card-holders movably mounted in the tray each arranged to hold a relatively small fraction of the set of cards, and means for sheathing the upper edges of the front and rear sides of said card-holders to prevent interference in placing the cards, substantially as set forth.

44. In a card indexing mechanism, a tray for holding a set of cards, card-holders movably mounted in the tray each arranged to hold a relatively small fraction of the set of cards, and cross-braces on the tray arranged to sheathe the upper edges of the front and rear sides of said card-holders to prevent interference in placing the cards, substantially as set forth.

45. In a card indexing mechanism, a tray for holding a set of cards, card-holders movably mounted in the tray each arranged to hold a relatively small fraction of the set of cards, means in the case for moving such card-holders in connection with the selection of a card, and individual guiding means comprising upstanding flanges on the tray for guiding each of the card-holders, substantially as set forth.

46. In a card-indexing mechanism, a tray for a set of cards, shelves extending lengthwise of the tray, card-holders supported by said shelves each proportioned to hold a fraction of the set, means in the case for moving the card-holders crosswise of the tray, and guiding means comprising integral upstanding flanges for the card-holders on said shelves, substantially as set forth.

47. A card-indexing device as in claim 46, the supporting faces of the shelves extending obliquely upward crosswise of the tray, substantially as set forth.

48. A card-indexing device as in claim 46, the supporting faces of the shelves extending obliquely upward crosswise of the tray, and individual guides on the shelves for each card-holder, substantially as set forth.

49. In a card-indexing mechanism, a tray for a set of cards divided into groups and sub-groups, movable spring-held card-holders for the sub-groups, positioning keys for the card-holders, means for locking down an actuated key, means for selecting cards in the corresponding holder, means for selectively rejecting selected cards, and means for cushioning the return of a card-holder and its positioning key, substantially as set forth.

50. A card-indexing mechanism as in claim 49, said means also cushioning the projecting movement of the selecting and rejecting means, substantially as set forth.

51. In a card-indexing mechanism, a tray for a set of cards divided into groups and sub-groups, movable spring-held card-holders for the sub-groups, positioning keys for the card-holders, means for locking down an actuated key, means for selecting cards in the corresponding holder, means for selectively rejecting selected cards including means for releasing the locking means of the positioning keys, and means for cushioning the return of the card-holder and its positioning key, said means also cushioning the projecting movement of the selecting and rejecting means, substantially as set forth.

52. A card indexing device comprising a container, cards in the container divided into groups and sub-groups, means for selecting a group, means operative upon lowering the same for selecting a sub-group in said group, means operative on a selective projection on a card to move it laterally to isolate said card in the said group, and means for pressing against a relatively rigid part of the card to complete the isolation as the said sub-group is returned to normal position, substantially as set forth.

53. A card indexing device comprising a container, cards in the container divided into groups and sub-groups, means for selecting a group, means operative upon lowering the same for selecting a sub-group in said group, means operative on a selective projection on a card to move it laterally to isolate said card in the sub-group, and means for pressing upwardly against the relatively rigid part of the card to complete the isolation as the said sub-group is returned to normal position, substantially as set forth.

54. A card indexing device comprising a container, cards in the container divided into groups and sub-groups, means for selecting a group, means operative upon lowering the same for selecting a sub-group in said group, means to isolate a plurality of cards from the sub-group by off-setting them laterally, and means to separate one or more of the cards so isolated from the others, substantially as set forth.

55. A card indexing device as claimed in claim 54 wherein the said separating means are adapted to act on selective projections of one or more cards, substantially as set forth.

56. A card indexing device comprising a container, cards in the container divided into groups and sub-groups, means for selecting a group, means operative upon lowering the same for selecting a sub-group in said group, means operative on an irregularity at one end of the card for isolating a card in the sub-group, and means for pressing against the lowered edge of the card simultaneously at spaced intervals to complete the isolation, substantially as set forth.

In witness whereof, I have hereunto set my hand at Waynesboro, Pennsylvania this 17th day of February, A. D. nineteen hundred and twenty-five.

DONALD A. NEVIN.